US012051447B2

(12) United States Patent
Jia et al.

(10) Patent No.: US 12,051,447 B2
(45) Date of Patent: Jul. 30, 2024

(54) VIDEO EDITING METHOD, APPARATUS, DEVICE, AND STORAGE MEDIUM

(71) Applicant: Beijing Zitiao Network Technology Co., Ltd., Beijing (CN)

(72) Inventors: Song Jia, Beijing (CN); Yingxuan Ji, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/543,807

(22) Filed: Dec. 18, 2023

(65) Prior Publication Data

US 2024/0153537 A1    May 9, 2024

Related U.S. Application Data

(63) Continuation of application No. PCT/CN2023/118776, filed on Sep. 14, 2023.

(30) Foreign Application Priority Data

Sep. 14, 2022 (CN) .......................... 202211117918.5

(51) Int. Cl.
G11B 27/036 (2006.01)
(52) U.S. Cl.
CPC .................................. *G11B 27/036* (2013.01)
(58) Field of Classification Search
CPC .................................................. G11B 27/036
See application file for complete search history.

(56) References Cited

U.S. PATENT DOCUMENTS

| 1,057,628 | A | * | 4/1913 | Avedissian | E04H 15/18 135/117 |
|---|---|---|---|---|---|
| 2007/0260968 | A1 | * | 11/2007 | Howard | G11B 27/034 |
| 2009/0087161 | A1 | * | 4/2009 | Roberts | H04N 5/262 386/285 |
| 2010/0154065 | A1 | * | 6/2010 | Cohen | G11B 27/036 726/28 |
| 2017/0085786 | A1 | | 3/2017 | Ishida et al. | |

FOREIGN PATENT DOCUMENTS

| CN | 110139159 A | 8/2019 |
|---|---|---|
| CN | 110825912 A | 2/2020 |
| CN | 112422831 A | 2/2021 |
| CN | 113660528 A | 11/2021 |
| CN | 114286176 A | 4/2022 |
| WO | 2022/088783 A1 | 5/2022 |
| WO | 2022/126664 A1 | 6/2022 |

* cited by examiner

*Primary Examiner* — Mishawn N. Hunter

(57) ABSTRACT

The present disclosure provides a video editing method, an apparatus, a device, and a storage medium, and the method includes: first displaying, in response to a preset triggering operation for a target video template, at least one material adding entry corresponding to the target video template; receiving a first video material added from a first material adding entry among the at least one material adding entry; and generating a first video clip and a freeze-frame video clip based on the first video material in accordance with a video editing operation indicated by the target video template, and compositing to obtain a target video based on the first video clip and the freeze-frame video clip.

20 Claims, 8 Drawing Sheets

VIDEO EDITING METHOD, APPARATUS, DEVICE, AND STORAGE MEDIUM

CROSS-REFERENCE TO RELATED APPLICATION

This application is a continuation of International Application No. PCT/CN2023/118776 filed on Sep. 14, 2023, which claims the priority to and benefits of Chinese Patent Application No. 202211117918.5, filed on Sep. 14, 2022. All the aforementioned patent applications are hereby incorporated by reference in their entireties.

TECHNICAL FIELD

Embodiments of the present disclosure relate to a video editing method, an apparatus, a device, and a storage medium.

BACKGROUND

With the continuous development of video processing technology, people have more and more requirements for the ways of video editing. Therefore, how to enrich the ways of video editing to meet the growing video editing needs of users and improve the user experience is a technical problem that needs to be solved urgently.

SUMMARY

In order to solve the above-mentioned technical problem, the present disclosure provides a video editing method, and the method comprises:

In a first aspect, the present disclosure provides a video editing method, and the method comprises:
  displaying, in response to a preset triggering operation for a target video template, at least one material adding entry corresponding to the target video template;
  receiving a first video material added from a first material adding entry among the at least one material adding entry; and
  generating a first video clip and a freeze-frame video clip based on the first video material in accordance with a video editing operation indicated by the target video template, and compositing to obtain a target video based on the first video clip and the freeze-frame video clip;
  the target video template is configured to indicate the video editing operation to be performed on an added video material to generate a plurality of video clips and composite the plurality of video clips; a mapping relationship between the first video clip and the freeze-frame video clip and positional information of a specified video frame in the first video clip are recorded in the target video template; and the freeze-frame video clip is a video clip obtained by freeze-frame processing based on the specified video frame in the first video clip.

In an optional embodiment, before compositing to obtain a target video based on the first video clip and the freeze-frame video clip, the video editing method further comprises:
  displaying, in response to a replacement operation for the freeze-frame video clip, a video track corresponding to the first video clip;
  determining, based on the video track corresponding to the first video clip, a target video frame from the first video clip; and
  generating a target replacement video clip based on the target video frame and updating the freeze-frame video clip corresponding to the first video material using the target replacement video clip.

In an optional embodiment, before compositing to obtain a target video based on the first video clip and the freeze-frame video clip, the video editing method further comprises:
  acquiring an editing result video clip corresponding to the first video clip after receiving an editing operation for the first video clip, in which the editing operation comprises a replacement operation, a shooting operation or a clipping operation; and
  generating a post-editing freeze-frame video clip based on the editing result video clip in accordance with the video editing operation indicated by the target video template;
  accordingly, compositing to obtain the target video based on the first video clip and the freeze-frame video clip, comprises:
  compositing to obtain the target video based on the editing result video clip and the post-editing freeze-frame video clip.

In an optional embodiment, play time information for the freeze-frame video clip is recorded in the target video template, and generating a first video clip and a freeze-frame video clip based on the first video material in accordance with a video editing operation indicated by the target video template, comprises:
  generating the first video clip based on the first video material;
  acquiring the specified video frame from the first video clip based on the positional information of the specified video frame in the first video clip that is recorded in the target video template; and
  generating the freeze-frame video clip corresponding to the first video material in accordance with the video editing operation indicated by the target video template based on the play time information of the freeze-frame video clip that is recorded in the target video template as well as the specified video frame.

In an optional embodiment, a picture-in-picture identification corresponding to the freeze-frame video clip is recorded in the target video template, and the picture-in-picture identification is configured to indicate whether or not the freeze-frame video clip is in a picture-in-picture form; and
  generating the freeze-frame video clip corresponding to the first video material in accordance with the video editing operation indicated by the target video template based on the play time information of the freeze-frame video clip that is recorded in the target video template as well as the specified video frame, comprises:
  generating the freeze-frame video clip corresponding to the first video clip in accordance with the video editing operation indicated by the target video template based on the play time information of the freeze-frame video clip and the picture-in-picture identification that are recorded in the target video template as well as the specified video frame.

In a second aspect, the present disclosure further provides a video editing method, and the method comprises:
  acquiring a mapping relationship between a freeze-frame video clip and a first video material in a video editing draft and positional information of a specified video frame in a first video clip, in which the specified video frame is configured to obtain the freeze-frame video clip after freeze-frame processing, and the video editing draft comprises an initial video material and a video editing operation for the initial video material; and in response to a template publishing operation for the video editing draft, generating and publishing a video template corresponding to the video editing draft, based on the video editing draft, the mapping relationship between the freeze-frame video clip and the first video material, and the positional information of the specified video frame in the first video clip, in which the video template is configured to indicate the video editing operation to be performed on an added video material to generate the first video clip and the freeze-frame video clip and composite the first video clip and the freeze-frame video clip into a target video.

In an optional embodiment, acquiring a mapping relationship between a freeze-frame video clip and a first video material in a video editing draft and positional information of a specified video frame in a first video clip, comprises:

acquiring the mapping relationship between the freeze-frame video clip and the first video material in the video editing draft and the positional information of the specified video frame in the first video clip when a preset freeze-frame binding switch is in an on state.

In an optional embodiment, the video editing method further comprises:

displaying a script setting column corresponding to the initial video material on a script editing page, in which the script editing column is configured to add an editing script corresponding to the initial video material;

accordingly, in response to a template publishing operation for the video editing draft, generating and publishing a video template corresponding to the video editing draft, based on the video editing draft, the mapping relationship between the freeze-frame video clip and the first video clip, and the positional information of the specified video frame in the first video clip, comprises:

in response to the template publishing operation for the video editing draft, generating and publishing the video template corresponding to the video editing draft, based on the video editing draft, the editing script corresponding to the initial video material and the mapping relationship between the freeze-frame video clip and the first video material in the video editing draft, and the positional information of the specified video frame in the first video clip.

In a third aspect, the present disclosure provides a video editing apparatus, and the video editing apparatus comprises:

a first display module, configured to display, in response to a preset triggering operation for a target video template, at least one material adding entry corresponding to the target video template;

a receiving module, configured to receive a first video material added from a first material adding entry among the at least one material adding entry;

a first generation module, configured to generate a first video clip and a freeze-frame video clip based on the first video material in accordance with a video editing operation indicated by the target video template; and a first composition module, configured to composite to obtain a target video based on the first video clip and the freeze-frame video clip;

the target video template is configured to indicate the video editing operation to be performed on an added video material to generate a plurality of video clips and composite the plurality of video clips; a mapping relationship between the first video clip and the freeze-frame video clip and positional information of a specified video frame in the first video clip are recorded in the target video template; and the freeze-frame video clip is a video clip obtained by freeze-frame processing based on the specified video frame in the first video clip.

In a fourth aspect, the present disclosure further provides a video editing apparatus, and the video editing apparatus comprises:

a second acquisition module, configured to acquire a mapping relationship between a freeze-frame video clip and a first video material in a video editing draft and positional information of a specified video frame in a first video clip, in which the specified video frame is configured to obtain the freeze-frame video clip after freeze-frame processing, and the video editing draft comprises an initial video material and a video editing operation for the initial video material; and a fourth generation module, configured to, in response to a template publishing operation for the video editing draft, generate and publish a video template corresponding to the video editing draft, based on the video editing draft, the mapping relationship between the freeze-frame video clip and the first video material, and the positional information of the specified video frame in the first video clip, in which the video template is configured to indicate the video editing operation to be performed on an added video material to generate the first video clip and the freeze-frame video clip and composite the first video clip and the freeze-frame video clip into a target video.

In a fifth aspect, the present disclosure provides a computer-readable storage medium, instructions are stored in the computer-readable storage medium, and the instructions, when run on a terminal device, cause the terminal device to implement any one of the video editing methods mentioned above.

In a sixth aspect, the present disclosure provides a video editing device, comprising a memory, a processor, and a computer program stored in the memory and runnable on the processor, and the processor, when executing the computer program, implements any one of the video editing methods mentioned above.

In a seventh aspect, the present disclosure provides a computer program product, comprising a computer program/instruction, and the computer program/instruction, when executed by a processor, implements any one of the video editing methods mentioned above.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

In order to enrich the ways of video editing and improve the user experience, the embodiments of the present disclosure provide a video editing method, which specifically includes, first displaying, in response to a preset triggering operation for a target video template, at least one material adding entry corresponding to the target video template; receiving a first video material added for a first material adding entry among the at least one material adding entry; and generating a first video clip and a freeze-frame video clip based on the first video material in accordance with a video editing operation indicated by the target video template, and compositing to obtain a target video based on the first video clip and the freeze-frame video clip; the target video template is configured to indicate the video editing operation to be performed on an added video material to generate a plurality of video clips and composite the plurality of video clips, a mapping relationship between the first video clip and the freeze-frame video clip and positional information of a specified video frame in the first video clip are recorded in the target video template, and the freeze-frame video clip is a video clip obtained by freeze-frame processing based on the specified video frame in the first video clip. The embodiments of the present disclosure are capable of automatically generating the first video clip and the freeze-frame video clip based on the first video material added by the user, and compositing to obtain the target video, which enriches the ways of video editing and improves the user experience.

Figure 1:
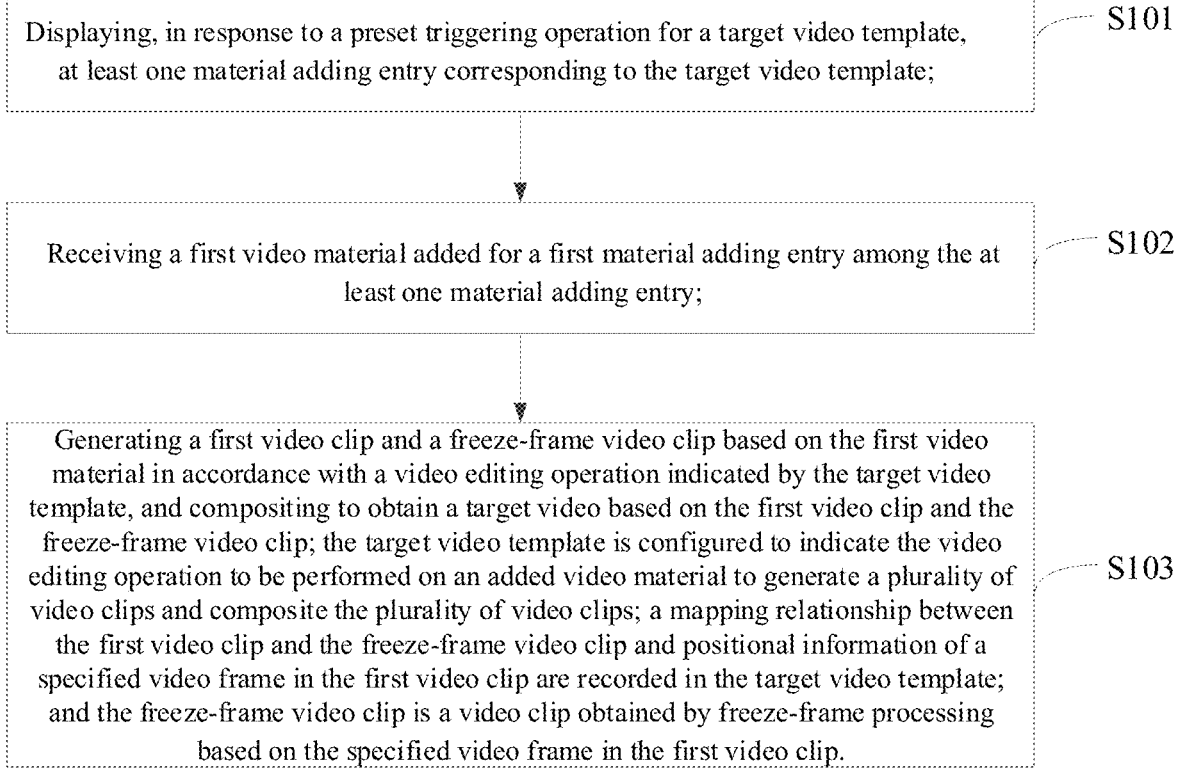
FIG. 1 is a flowchart of a video editing method provided by at least an embodiment of the present disclosure.

In view of this, the embodiments of the present disclosure provide a video editing method. Referring to FIG. 1, which is a flowchart of a video editing method provided by at least an embodiment of the present disclosure, the method includes the follow steps.

S101: displaying, in response to a preset triggering operation for a target video template, at least one material adding entry corresponding to the target video template.

In the embodiments of the present disclosure, the target video template is configured to indicate a video editing operation to be performed on an added video material to generate a plurality of video clips and composite the plurality of video clips. The material adding entry corresponding to the target video template is configured to add video material. The material adding entry corresponding to the target video template may be one or more.

In the embodiments of the present disclosure, the at least one material adding entry corresponding to the target video template is displayed on a material adding page when the preset triggering operation for the target video template is received. For example, the preset triggering operation for the target video template may be a video editing operation for the target video template, such as an operation of generating a video by applying the target video template.

Figure 2:
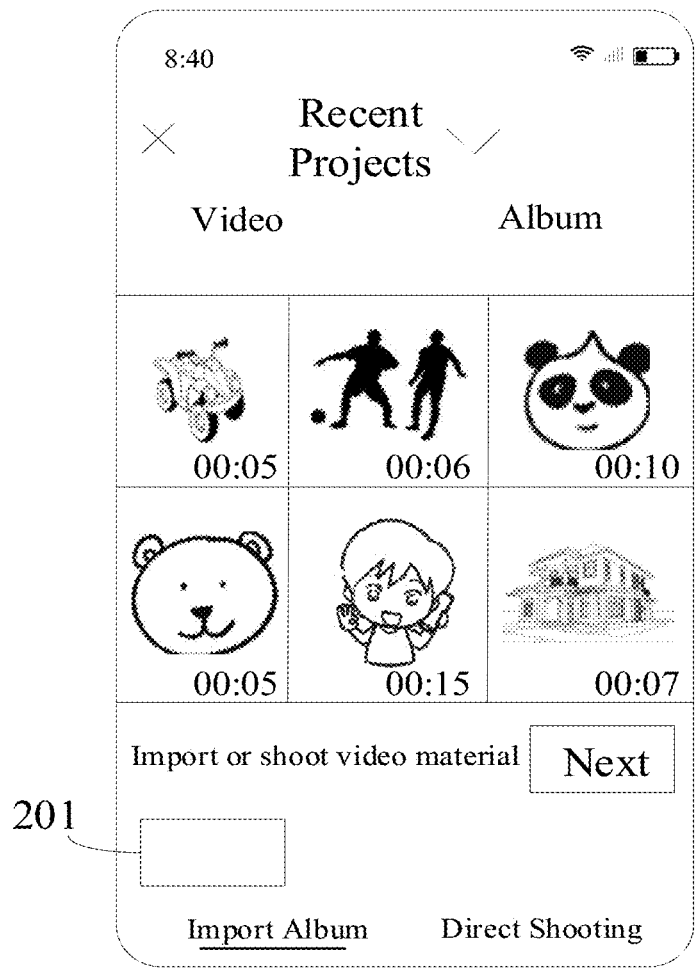
FIG. 2 is a schematic diagram of a material adding page provided by at least an embodiment of the present disclosure.

Referring to FIG. 2, which is a schematic diagram of a material adding page provided by at least an embodiment of the present disclosure, the material adding page is displayed when the preset triggering operation for the target video template is received. As illustrated in FIG. 2, a material adding entry 201 corresponding to the target video template is displayed on the material adding page.

S102: receiving a first video material added for a first material adding entry among the at least one material adding entry.

For example, the first material adding entry may be any one of the material adding entries corresponding to the target video template.

In the embodiments of the present disclosure, after the at least one material adding entry corresponding to the target video template is displayed, the user may add a video material for any one of the material adding entries displayed. Specifically, the first video material added for the first material adding entry is received. For example, the first video material may come from a local album or may come from a local camera shooting in real time.

With continued reference to FIG. 2, the first material adding entry is represented by the material adding entry 201. In a practical application, after a user's triggering operation for the material adding entry 201 is received, an album importing page may be displayed, and the user may select any video material as the first video material from the album importing page. In addition, after the user's triggering operation for the material adding entry 201 is received, the user may also switch to a shooting page and obtain the first video material based on the shooting page.

S103: generating a first video clip and a freeze-frame video clip based on the first video material in accordance with a video editing operation indicated by the target video template, and compositing to obtain a target video based on the first video clip and the freeze-frame video clip.

For example, the target video template is configured to indicate the video editing operation to be performed on the added video material to generate a plurality of video clips and composite the plurality of video clips, and a mapping relationship between the first video clip and the freeze-frame video clip and positional information of a specified video frame in the first video clip are recorded in the target video template.

In the first video clip and the freeze-frame video clip having a mapping relationship, the freeze-frame video clip is a video clip obtained by freeze-frame processing based on the specified video frame in the first video clip.

The video editing operation indicated by the target video template not only includes the freeze-frame processing operation on the added video material, but may also include an effect processing operation on the added video material, such as adding a sticker or a mask layer.

The positional information of the specified video frame in the first video clip refers to the position of the specified video frame in the first video clip, for example, the specified video frame may be the last frame, the first frame, or any frame in the middle of the first video clip.

The step of generating a first video clip and a freeze-frame video clip based on the first video material in accordance with a video editing operation indicated by the target video template may specifically include: acquiring the specified video frame from the first video clip in accordance with the mapping relationship between the first video clip and the freeze-frame video clip and the positional information of the specified video frame in the first video clip that are recorded in the target video template, and performing freeze-frame processing on the specified video frame to obtain the freeze-frame video clip corresponding to the first video clip.

In the embodiments of the present disclosure, after the video material added to each material adding entry corresponding to the target video template is received, the video material is processed in accordance with the video editing operation indicated by the target video template, the first video clip and the freeze-frame video clip are generated for the added first video material, and then the target video is obtained by compositing the generated first video clip and the freeze-frame video clip.

Because a total duration of the first video material added by the user may be longer than a required duration corresponding to the first video clip, the first video clip may be a partial clip taken from the first video material based on a predetermined strategy. The present disclosure is not limited thereto.

In an optional embodiment, the target video template not only records the positional information of the specified video frame in the first video clip, but also can record play time information, such as a play duration, of the freeze-frame video clip.

Specifically, the freeze-frame video clip may be generated based on the play time information of the freeze-frame video clip that is recorded in the target video template and the specified video frame, and specifically, the play time information of the freeze-frame video clip may refer to the play duration of the specified video frame, such as 3s, 5s, etc.

In an optional embodiment, after the first video material added for the first material adding entry is received, a first video clip is generated based on the first video material firstly, a specified video frame is acquired from the first video clip based on the positional information of the specified video frame in the first video clip that is recorded in the target video template, and then, the freeze-frame video clip corresponding to the first video material is generated based on the play time information of the freeze-frame video clip that is recorded in the target video template.

In the embodiments of the present disclosure, if the first video clip is a partial clip of the first video material, the first video clip may be generated from the previous part of the first video material, assuming that the first video material has a duration of 20s, and the first video clip has a duration of 8s, then the first video clip may be a video clip including 0-8s of the first video material.

It should be noted that the embodiments of the present disclosure do not limit the method of determining the first video clip based on the first video material.

Specifically, the freeze-frame video clip is generated by the method described below.

Figure 3:
FIG. 3 is a schematic diagram of a freeze-frame structure provided by at least an embodiment of the present disclosure.

In an optional embodiment, when a specified video frame picture is located in the first frame of the first video clip, its corresponding freeze-frame structure is illustrated in FIG. 3, with a freeze-frame video clip on the left side and a first video clip on the right side. Specifically, the freeze-frame video clip is generated based on a video frame of the first frame of the first video clip and the play time information of the freeze-frame video clip recorded in the target video template.

Figure 4:
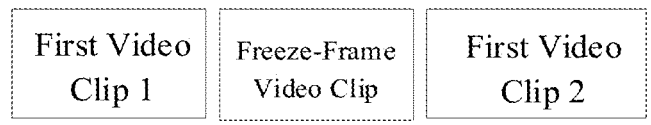
FIG. 4 is a schematic diagram of another freeze-frame structure provided by at least an embodiment of the present disclosure.

In another optional embodiment, when a specified video frame is located in an intermediate frame of the first video clip, its corresponding freeze-frame structure is illustrated in FIG. 4. The freeze-frame video clip splits the first video clip into two parts, i.e., a first video clip 1 and a first video clip 2 illustrated in FIG. 4. Specifically, the freeze-frame video clip is generated based on a video frame of the intermediate frame of the first video clip and the play time information of the freeze-frame video clip recorded in the target video template.

Figure 5:
FIG. 5 is a schematic diagram of yet another freeze-frame structure provided by at least an embodiment of the present disclosure.

In yet another optional embodiment, when a specified video frame is located in the last frame of the first video clip, its corresponding freeze-frame structure is illustrated in FIG. 5, with a first video clip on the left side and a freeze-frame video clip on the right side. Specifically, the freeze-frame video clip is generated based on a video frame of the last frame of the first video clip and the play time information of the freeze-frame video clip recorded in the target video template.

In the embodiments of the present disclosure, assuming that the positional information of the specified video frame in the first video clip recorded in the target video template refers to the last frame of the first video clip, and the play time information of the freeze-frame video clip is 1s, after the first video clip is generated based on the first video material, the last frame in the first video clip is acquired as a specified video frame, and then the specified video frame is performed by freeze-frame processing to generate a freeze-frame video clip with a duration of 1s as the freeze-frame video clip corresponding to the first video material.

In addition, in order to improve the user experience, the freeze-frame video clip may also be displayed in a picture-in-picture form. Specifically, a picture-in-picture identification corresponding to the freeze-frame video clip may also be recorded in the target video template, and the picture-in-picture identification is configured to indicate whether or not the freeze-frame video clip is displayed in the picture-in-picture form.

In an optional embodiment, the freeze-frame video clip corresponding to the first video clip is generated in accordance with the video editing operation indicated by the target video template based on the play time information of the freeze-frame video clip and the picture-in-picture identification that are recorded in the target video template, as well as the specified video frame.

For example, the picture-in-picture identification is configured to indicate whether the freeze-frame video clip is in the picture-in-picture form.

In the embodiments of the present disclosure, if the picture-in-picture identification corresponding to the freeze-frame video clip is recorded in the target video template, the freeze-frame video clip corresponding to the first video material that is generated based on the video editing operation indicated by the target video template is displayed in the picture-in-picture form.

Figure 6:
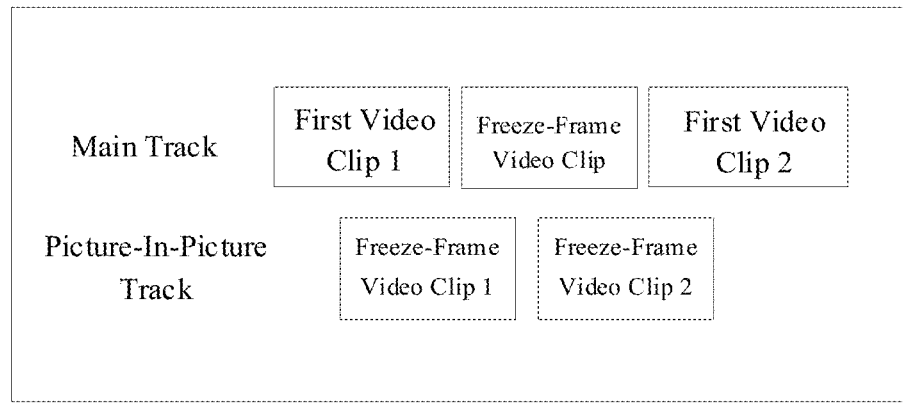
FIG. 6 is a schematic diagram of still another freeze-frame structure provided by at least an embodiment of the present disclosure.

Specifically, FIG. 6 is a schematic diagram of yet another freeze-frame structure provided by at least an embodiment of the present disclosure. As illustrated in FIG. 6, if there is a picture-in-picture identification corresponding to a freeze-frame video clip, the freeze-frame video clip having the corresponding picture-in-picture identification is located in a picture-in-picture track, such that the freeze-frame video clip having the corresponding picture-in-picture identification is displayed in the picture-in-picture form.

According to the embodiments of the present disclosure, the video editing method includes, firstly, displaying, in response to a preset triggering operation for a target video template, at least one material adding entry corresponding to the target video template; receiving a first video material added for a first material adding entry among the at least one material adding entry; and generating a first video clip and a freeze-frame video clip based on the first video material in accordance with a video editing operation indicated by the target video template, and compositing to obtain a target video based on the first video clip and the freeze-frame video clip; the target video template is configured to indicate the video editing operation to be performed on an added video material to generate a plurality of video clips and composite the plurality of video clips, a mapping relationship between the first video clip and the freeze-frame video clip and positional information of a specified video frame in the first video clip are recorded in the target video template, and the freeze-frame video clip is a video clip obtained by freeze-frame processing based on the specified video frame in the first video clip. The embodiments of the present disclosure are capable of automatically generating the first video clip and the freeze-frame video clip based on the first video material added by the user, and compositing to obtain the target video, which enriches the ways of video editing and improves the user experience.

In addition, because the freeze-frame video clip is automatically generated based on the first video clip, in the video editing method provided by the embodiments of the present disclosure, the target video with a freeze-frame effect can be generated without requiring the user to additionally upload the freeze-frame video clip, thus reducing an editing threshold of the video with the freeze-frame effect and improving the user experience in video editing.

Figure 7:
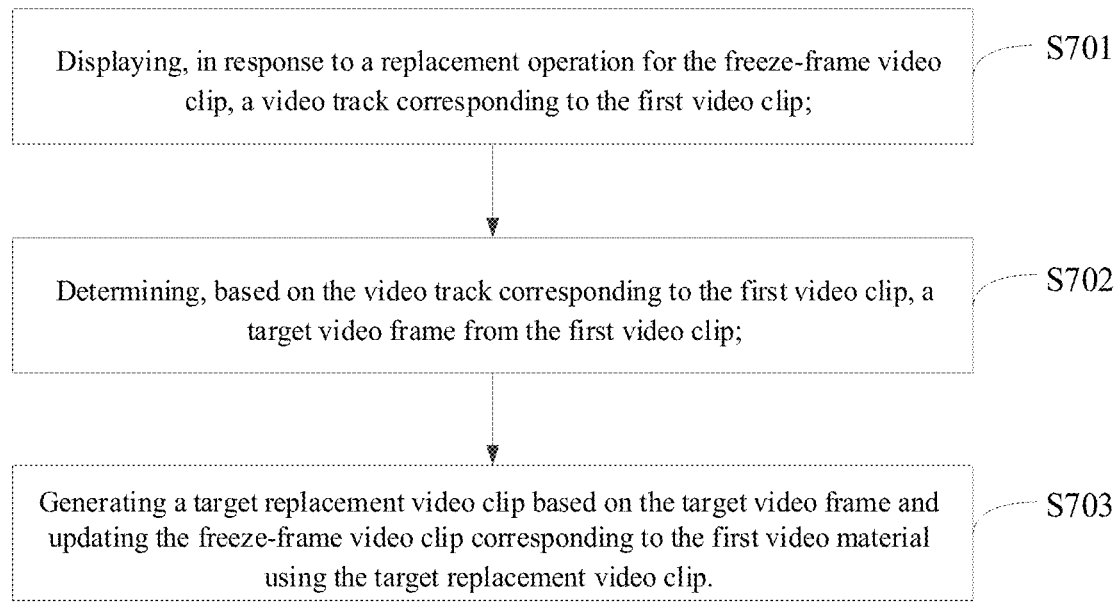
FIG. 7 is a flowchart of another video editing method provided by at least an embodiment of the present disclosure.

In a practical application, in order to further enrich the ways of video editing and improve the user experience, the embodiments of the present disclosure may further support a function of replacing the freeze-frame video clip. Specifically, on the basis of the above-mentioned embodiments, the embodiments of the present disclosure may further include the following steps. FIG. 7 is a flowchart of another video editing method provided by at least an embodiment of the present disclosure. The method includes the following steps.

S701: displaying, in response to a replacement operation for the freeze-frame video clip, a video track corresponding to the first video clip.

For example, the video track corresponding to the first video clip is configured to display respective video frames in the first video clip.

In the embodiments of the present disclosure, because the freeze-frame video clip has a mapping relationship with the first video clip, after the replacement operation for the freeze-frame video clip corresponding to the first video clip is received, an effect preview page jumps to a material editing page, the video track corresponding to the first video clip can be displayed on the material editing page, so that the user can preferentially select target video frame pictures from the first video clip to generate the freeze-frame video clip corresponding to the first video clip, thereby ensuring the freeze-frame effect in the generated target video.

Figure 8:
FIG. 8 is a schematic diagram of an effect preview page provided by at least an embodiment of the present disclosure.

FIG. 8 is a schematic diagram of an effect preview page provided by at least an embodiment of the present disclosure. A material editing entry 801 corresponding to the freeze-frame video clip is displayed on this page. The user can trigger the display of a material editing box 802 by clicking on the material editing entry 801, and the user can trigger a replacement operation of the freeze-frame video clip by clicking on a replacement control in the material editing box 802. Specifically, after the replacement operation for the freeze-frame video clip is received, a video track corresponding to the first video clip, as illustrated in FIG. 9, is displayed.

S702: determining, based on the video track corresponding to the first video clip, a target video frame from the first video clip.

In the embodiments of the present disclosure, any video frame in the video track corresponding to the first video clip may be selected as the target video frame.

Figure 9:
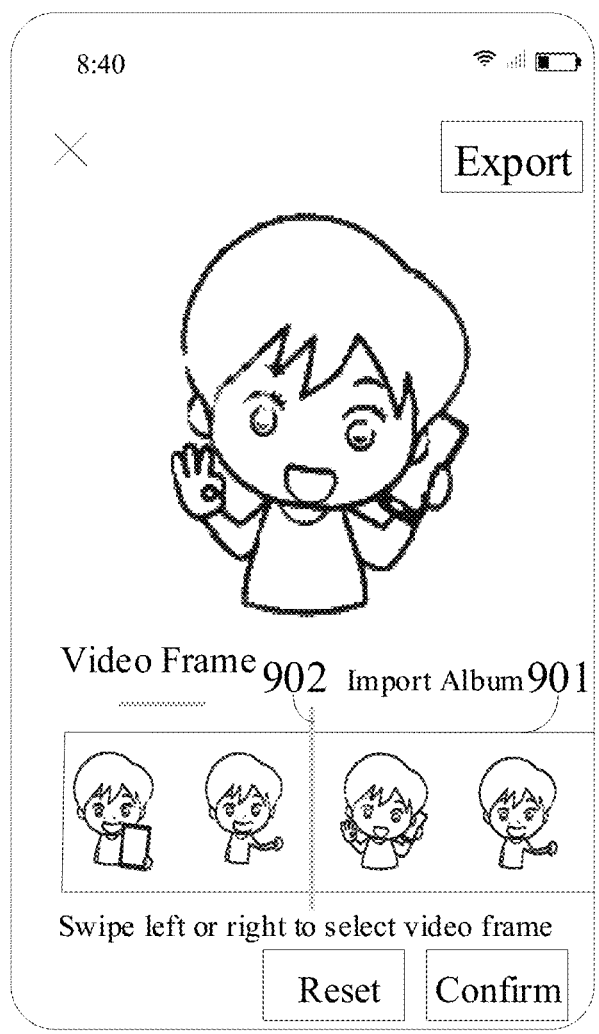
FIG. 9 is a schematic diagram of a material editing page provided by at least an embodiment of the present disclosure.

Specifically, with reference to FIG. 9, which is a schematic diagram of a material editing page provided by at least an embodiment of the present disclosure, a video track 901 corresponding to the first video clip is displayed on the material editing page, and the user can select the target video frame by dragging a control 902.

In an optional embodiment, the target video frame may also be determined from a user album. With continued reference to FIG. 9, when the user clicks on "Import Album", a jump to a user album page may be made, and on the user album page, the user may select a certain picture or a certain frame image in a certain video from the user album as the target video frame.

S703: generating a target replacement video clip based on the target video frame and updating the freeze-frame video clip corresponding to the first video material using the target replacement video clip.

In the embodiments of the present disclosure, after the target video frame is determined, the target replacement video clip is generated in accordance with the video editing operation indicated by the target video template based on the play time information of the freeze-frame video clip recorded in the target video template as well as the target video frame, and the freeze-frame video clip corresponding to the first video material is updated using the target replacement video clip.

In the video editing method according to the embodiments of the present disclosure, in response to the replacement operation for the freeze-frame video clip, the video track corresponding to the first video clip is displayed; the target video frame is determined from the first video clip based on the video track corresponding to the first video clip; the target replacement video clip is generated based on the target video frame; and the freeze-frame video clip corresponding to the first video material is updated using the target replacement video clip. In this way, the replacement of the freeze-frame video clip is realized, the ways of video editing are enriched, and the user experience is improved.

In addition, by preferentially displaying the video track corresponding to the first video clip for the user, the user is guided to preferentially determine the target video frame from the first video clip for generating the freeze-frame video clip, so that the freeze-frame effect of the target video can be ensured.

In addition, in order to further enrich the ways of video editing and improve the user experience, in the embodiments of the present disclosure, an editing operation on the first video clip may also be supported, and the freeze-frame video clip may be updated in synchronous linkage when the editing operation on the first video clip is triggered, thus ensuring the freeze-frame effect of the target video.

Figure 10:
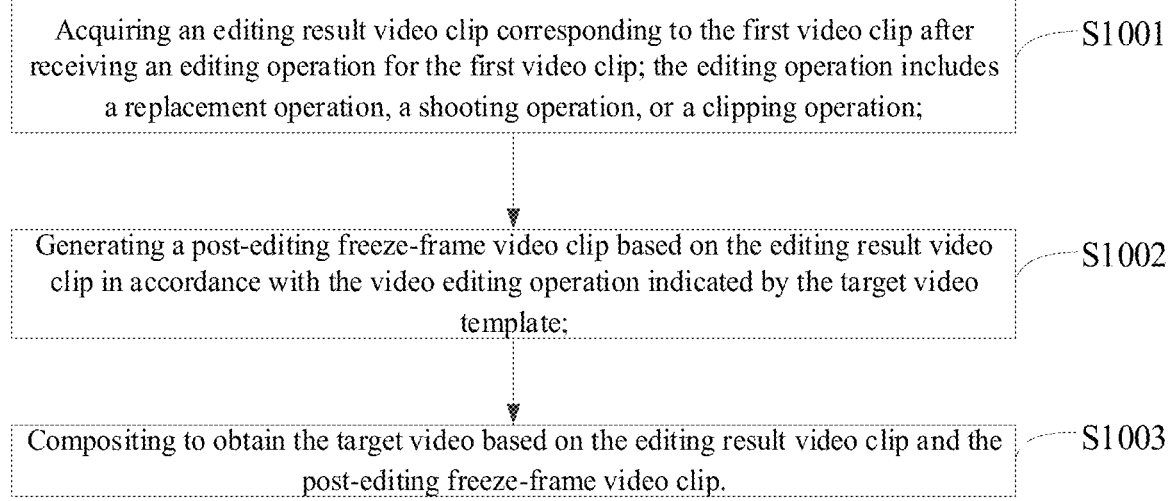
FIG. 10 is a flowchart of another video editing method provided by at least an embodiment of the present disclosure.

Specifically, the video editing method further includes the following steps on the basis of the above-mentioned embodiments. Referring to FIG. 10, which is a flowchart of another video editing method provided by at least an embodiment of the present disclosure, the video editing method includes the following steps.

S1001: acquiring an editing result video clip corresponding to the first video clip after receiving an editing operation for the first video clip.

For example, the editing operation includes a replacement operation, a shooting operation, or a clipping operation.

The editing result video clip is a video clip obtained after the editing operation is performed on the first video clip.

In an optional embodiment, after the replacement operation for the first video clip is received, any video material may be acquired, from a local album, as the editing result video clip corresponding to the first video clip.

In another optional embodiment, after the shooting operation for the first video clip is received, the video obtained from the shooting can be used as the editing result video clip corresponding to the first video clip.

In yet another optional embodiment, after the clipping operation for the first video clip is received, the first video clip may be clipped, and the clipped first video clip may be used as the editing result video clip corresponding to the first video clip.

S1002: generating a post-editing freeze-frame video clip based on the editing result video clip in accordance with the video editing operation indicated by the target video template.

After the editing result video clip corresponding to the first video clip is determined, a specified video frame picture corresponding to the positional information may be acquired from the editing result video clip based on the positional information of the specified video frame picture in the first video clip. Then, based on the play time information of the freeze-frame video clip recorded in the target video template, the specified video frame picture is performed by freeze-frame processing to obtain the post-editing freeze-frame video clip.

If the positional information of the specified video frame in the first video clip refers to a certain video frame in the middle of the first video clip, then two first video clips having a mapping relationship with the freeze-frame video clip generated based on the video frame are generated.

In an optional embodiment, assuming that there are a plurality of first video clips having a mapping relationship with the same freeze-frame video clip, then an editing result video clip corresponding to the first video clip is acquired after an editing operation triggered for any one of the plurality of first video clips is received, in this case, other first video clips may be generated based on the video material corresponding to the editing result video clip.

If the positional information of the specified video frame in the first video clip refers to a video frame of the last frame of the first video clip, then after the user's editing operation triggered for the first video clip is received, the editing result video clip corresponding to the first video clip is acquired, and the post-editing freeze frame video clip is generated based on the editing result video clip.

S1003: compositing to obtain the target video based on the editing result video clip and the post-editing freeze-frame video clip.

In the embodiments of the present disclosure, after the editing result video clip and the post-editing freeze-frame video clip are generated, the target video is obtained by compositing the editing result video clip and the post-editing freeze-frame video clip in accordance with a sequential relationship between the first video clip and the freeze-frame video clip.

In the video editing method provided by the embodiments of the present disclosure, an editing operation on the first video clip may be supported, and the freeze-frame video clip may be updated in synchronous linkage when the editing operation on the first video clip is triggered, thus ensuring the freeze-frame effect of the target video.

On the basis of the above-mentioned embodiments, the embodiments of the present disclosure further provide a video editing method for generating the target video template described in the above-mentioned embodiments.

Figure 11:
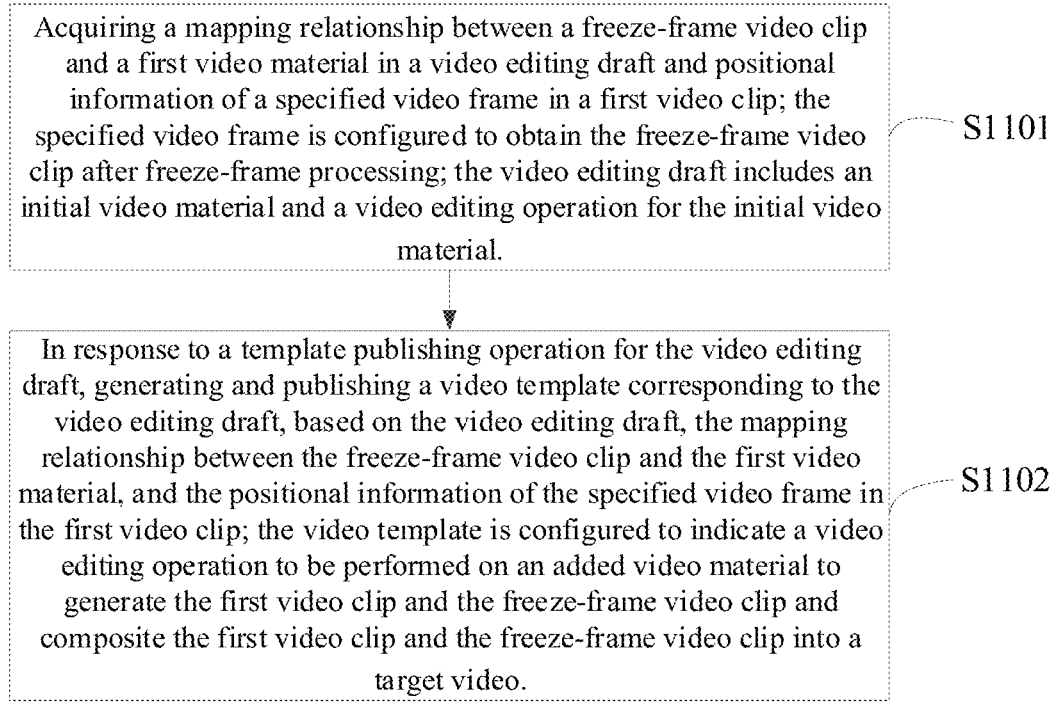
FIG. 11 is a flowchart of another video editing method provided by at least an embodiment of the present disclosure.

Specifically, referring to FIG. 11, which is a flowchart of another video editing method provided by at least an embodiment of the present disclosure, the video editing method includes the following steps.

S1101: acquiring a mapping relationship between a freeze-frame video clip and a first video material in a video editing draft and positional information of a specified video frame in a first video clip.

For example, the specified video frame is configured to obtain the freeze-frame video clip after freeze-frame processing.

The video editing draft includes an initial video material and a video editing operation for the initial video material.

In an optional embodiment, the mapping relationship between the freeze-frame video clip and the first video material in the video editing draft and the positional information of the specified video frame in the first video clip are acquired when a preset freeze-frame binding switch is in an on state.

For example, the preset freeze-frame binding switch refers to a switch preset for controlling a mapping relationship between the freeze-frame video clip and the initial video material. If the preset freeze-frame binding switch is on, the mapping relationship is set for the first video clip and the freeze-frame video clip, so that the user does not need to upload the freeze-frame video clip when using the video template published based on the video editing draft, thus facilitating the video editing operation.

Figure 12:
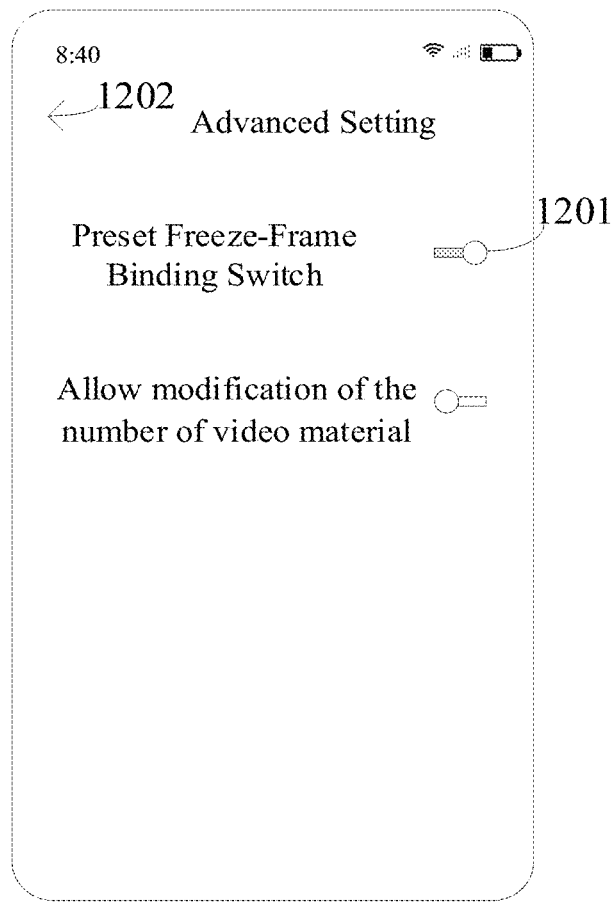
FIG. 12 is a schematic diagram of an advanced setting page provided by at least an embodiment of the present disclosure.

In the embodiments of the present disclosure, the preset freeze-frame binding switch may be set on an advanced setting page, as illustrated in FIG. 12, in this advanced setting page, on and off of the preset freeze-frame binding switch can be controlled by clicking on a control 1201, after a template creator has finished setting the preset freeze-frame binding switch.

It should be noted that when the preset freeze-frame binding switch is in an on state, a switch of allowing to modify the number of video material is off, as illustrated in FIG. 12. Because the number of video material that the user needs to upload is determined when the preset freeze-frame binding switch is on, then the user is not allowed to modify the number of video material.

S1102: in response to a template publishing operation for the video editing draft, generating and publishing a video template corresponding to the video editing draft, based on the video editing draft, the mapping relationship between the freeze-frame video clip and the first video material, and the positional information of the specified video frame in the first video clip.

For example, the video template is configured to indicate a video editing operation to be performed on an added video material to generate the first video clip and the freeze-frame video clip and composite the first video clip and the freeze-frame video clip into a target video.

In the embodiments of the present disclosure, after the template publishing operation on the video draft is received from the template creator, the initial video material in the video editing draft is used to generate an original video clip and its corresponding freeze-frame video clip based on the mapping relationship between the freeze-frame video clip and the first video material and the positional information of the specified video frame in the first video clip, and then the video template corresponding to the video editing draft is generated and published for easy viewing by the user based on the initial video clip and its corresponding freeze-frame video.

In addition, in order to help the user understand the template published by the template creator, a corresponding editing script may also be added for the initial video material, for example, the editing script may refer to the shooting content and shooting method of the initial video material, and the like, which guides the user to quickly find an appropriate video material.

In an optional embodiment, a script setting column corresponding to the initial video material is displayed on the script editing page. In response to a template publishing operation for the video editing draft, a video template corresponding to the video editing draft is generated and published based on the video editing draft, the editing script corresponding to the initial video material and the mapping relationship between the freeze-frame video clip and the first video material in the video editing draft, and the positional information of the specified video frame in the first video clip.

For example, the script editing column is configured to add an editing script corresponding to the initial video material.

In this embodiments of the present disclosure, the script setting column corresponding to the initial video material is displayed on the script editing page, and the template creator can add the editing script corresponding to the initial video material to the script setting column; once the adding is finished, after the template publishing operation for the video editing draft is received, the initial video material in the video editing draft is used to generate the initial video clip and its corresponding freeze-frame video clip based on the editing script corresponding to the initial video material and the mapping relationship between the freeze-frame video clip and the first video material in the video editing draft, and the positional information of the specified video frame in the first video clip, and then the video template corresponding to the video editing draft is generated and published based on the initial video clip and its corresponding freeze-frame video.

In the video editing method provided by the embodiments of the present disclosure, the mapping relationship between the freeze-frame video clip and the first video material in the video editing draft and the positional information of the specified video frame in the first video clip are acquired; and then, in response to a template publishing operation for the video editing draft, a video template corresponding to the video editing draft is generated and published based on the video editing draft, the mapping relationship between the freeze-frame video clip and the first video material, and the positional information of the specified video frame in the first video clip. The video template is configured to indicate a video editing operation to be performed on the added video material to generate the first video clip and the freeze-frame video clip and composite the first video clip and the freeze-frame video clip into a target video, thereby enriching the ways of video editing and improving the user experience.

Figure 13:
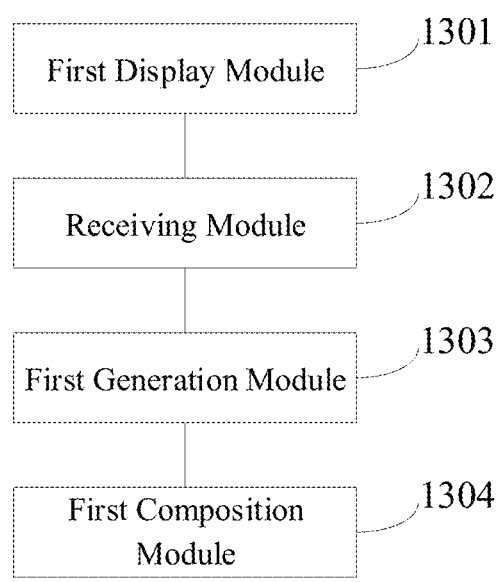
FIG. 13 is a schematic structural diagram of a video editing apparatus provided by at least an embodiment of the present disclosure.

Based on the same inventive concept as the above-mentioned method embodiments, the embodiments of the present disclosure further provide a video editing apparatus. With reference to FIG. 13, which is a schematic structural diagram of a video editing apparatus provided by at least an embodiment of the present disclosure, the video editing apparatus includes the following modules.

A first display module 1301 is configured to display, in response to a preset triggering operation for a target video template, at least one material adding entry corresponding to the target video template.

A receiving module 1302 is configured to receive a first video material added from a first material adding entry among the at least one material adding entry.

A first generation module 1303 is configured to generate a first video clip and a freeze-frame video clip based on the first video material in accordance with a video editing operation indicated by the target video template.

A first composition module 1304 is configured to composite to obtain a target video based on the first video clip and the freeze-frame video clip.

The target video template is configured to indicate the video editing operation to be performed on an added video material to generate a plurality of video clips and composite the plurality of video clips; a mapping relationship between the first video clip and the freeze-frame video clip and positional information of a specified video frame in the first video clip are recorded in the target video template; and the freeze-frame video clip is a video clip obtained by freeze-frame processing based on the specified video frame in the first video clip.

In an optional embodiment, the video editing apparatus further includes the following modules.

A second display module is configured to display, in response to a replacement operation for the freeze-frame video clip, a video track corresponding to the first video clip.

A determination module is configured to determine, based on the video track corresponding to the first video clip, a target video frame from the first video clip.

A second generation module is configured to generate a target replacement video clip based on the target video frame and update the freeze-frame video clip corresponding to the first video material using the target replacement video clip.

In an optional embodiment, the video editing apparatus further includes the following modules.

A first acquisition module is configured to acquire an editing result video clip corresponding to the first video clip after receiving an editing operation for the first video clip, and the editing operation includes a replacement operation, a shooting operation or a clipping operation.

A third generation module is configured to generate a post-editing freeze-frame video clip based on the editing result video clip in accordance with the video editing operation indicated by the target video template.

Accordingly, the first composition module is specifically configured to composite to obtain the target video based on the editing result video clip and the post-editing freeze-frame video clip.

In an optional embodiment, play time information for the freeze-frame video clip is recorded in the target video template, and the first generation module includes the following sub-modules.

A first generation sub-module is configured to generate the first video clip based on the first video material.

An acquisition sub-module is configured to acquire the specified video frame from the first video clip based on the positional information of the specified video frame in the first video clip that is recorded in the target video template.

A second generation sub-module is configured to generate the freeze-frame video clip corresponding to the first video material in accordance with the video editing operation indicated by the target video template based on the play time information of the freeze-frame video clip that is recorded in the target video template as well as the specified video frame.

In an optional embodiment, a picture-in-picture identification corresponding to the freeze-frame video clip is recorded in the target video template, and the picture-in-picture identification is configured to indicate whether or not the freeze-frame video clip is in a picture-in-picture form.

The second generation sub-module is specifically configured to generate the freeze-frame video clip corresponding to the first video clip in accordance with the video editing operation indicated by the target video template based on the play time information of the freeze-frame video clip and the picture-in-picture identification that are recorded in the target video template as well as the specified video frame.

In the video editing apparatus according to the embodiments of the present disclosure, firstly, in response to a preset triggering operation for a target video template, at least one material adding entry corresponding to the target video template is displayed; a first video material added from a first material adding entry among the at least one material adding entry is received; and a first video clip and a freeze-frame video clip are generated based on the first video material in accordance with a video editing operation indicated by the target video template, and a target video is obtained by compositing the first video clip and the freeze-frame video clip. The target video template is configured to indicate the video editing operation to be performed on an added video material to generate a plurality of video clips and composite the plurality of video clips, a mapping relationship between the first video clip and the freeze-frame video clip and positional information of a specified video frame in the first video clip are recorded in the target video template, and the freeze-frame video clip is a video clip obtained by freeze-frame processing based on the specified video frame in the first video clip. The embodiments of the present disclosure are capable of automatically generating the first video clip and the freeze-frame video clip based on the first video material added by the user, and compositing to obtain the target video, which enriches the ways of video editing and improves the user experience.

Figure 14:
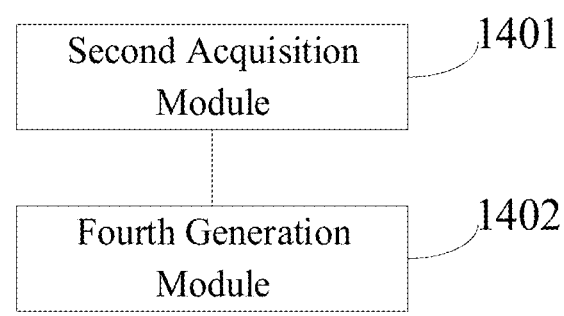
FIG. 14 is a schematic structural diagram of another video editing apparatus provided by at least an embodiment of the present disclosure.

Based on the same inventive concept as the above-mentioned method embodiments, the embodiments of the present disclosure further provide a video editing apparatus, with reference to FIG. 14, which is a schematic structural diagram of another video editing apparatus provided by at least an embodiment of the present disclosure, the video editing apparatus includes the following modules.

A second acquisition module 1401 is configured to acquire a mapping relationship between a freeze-frame video clip and a first video material in a video editing draft and positional information of a specified video frame in a first video clip. The specified video frame is configured to obtain the freeze-frame video clip after freeze-frame processing, and the video editing draft includes an initial video material and a video editing operation for the initial video material.

A fourth generation module 1402 is configured to, in response to a template publishing operation for the video editing draft, generate and publish a video template corresponding to the video editing draft, based on the video editing draft, the mapping relationship between the freeze-frame video clip and the first video material, and the positional information of the specified video frame in the first video clip. The video template is configured to indicate the video editing operation to be performed on an added video material to generate the first video clip and the freeze-frame video clip and composite the first video clip and the freeze-frame video clip into a target video.

In an optional embodiment, the second acquisition module is specifically configured to acquire the mapping relationship between the freeze-frame video clip and the first video material in the video editing draft and the positional information of the specified video frame in the first video clip when a preset freeze-frame binding switch is in an on state.

In an optional embodiment, the video editing apparatus further includes a third display module.

The third display module is configured to display a script setting column corresponding to the initial video material on a script editing page, and the script editing column is configured to add an editing script corresponding to the initial video material.

Accordingly, the fourth generation module is specifically configured to, in response to a template publishing operation for the video editing draft, generate and publish a video template corresponding to the video editing draft, based on the video editing draft, the editing script corresponding to the initial video material and the mapping relationship between the freeze-frame video clip and the first video material in the video editing draft, and the positional information of the specified video frame in the first video clip.

In the video editing apparatus provided by the embodiments of the present disclosure, the mapping relationship between the freeze-frame video clip and the first video material and the positional information of the specified video frame in the first video clip in the video editing draft are first acquired; the specified video frame is configured to obtain the freeze-frame video clip after freeze-frame processing; the video editing draft includes the initial video material and the video editing operation corresponding to the initial video material; in response to a template publishing operation for the video editing draft, a video template corresponding to the video editing draft is generated and published based on the video editing draft, the mapping relationship between the freeze-frame video clip and the first video material, and the positional information of the specified video frame in the first video clip. The video template is configured to indicate a video editing operation to be performed on the added video material to generate the first video clip and the freeze-frame video clip and composite the first video clip and the freeze-frame video clip into a target video, thereby enriching the ways of video editing and improving the user experience.

In addition to the methods and apparatuses described above, the embodiments of the present disclosure further provide a computer-readable storage medium, instructions are stored in the computer-readable storage medium, and the instructions, when run on a terminal device, cause the terminal device to implement the video editing method according to the embodiments of the present disclosure.

The embodiments of the present disclosure further provide a computer program product including a computer program/instruction, and the computer program/instruction, when executed by a processor, implements the video editing method according to the embodiments of the present disclosure.

Figure 15:
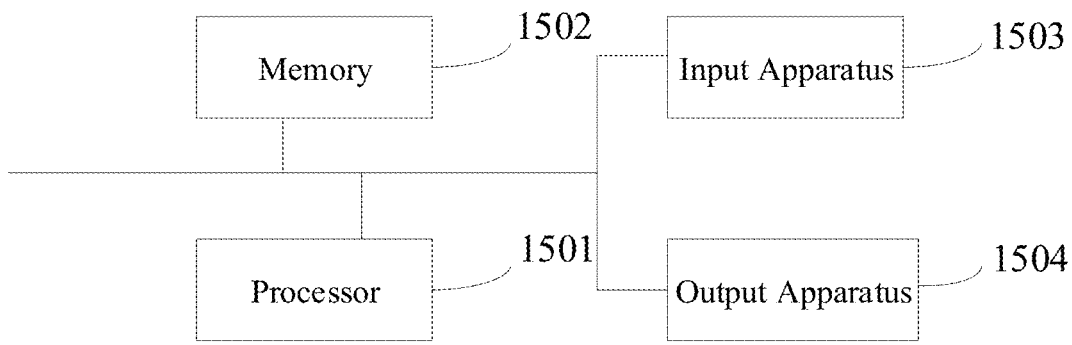
FIG. 15 is a schematic structural diagram of a video editing device provided by at least an embodiment of the present disclosure.

In addition, the embodiments of the present disclosure further provide a video editing device, referring to FIG. 15, which may include a processor 1501, a memory 1502, an input apparatus 1503, and an output apparatus 1504.

The number of the processor 1501 in the video editing device may be one or more, and one processor is taken as an example in FIG. 15. In some embodiments of the present disclosure, the processor 1501, the memory 1502, the input apparatus 1503 and the output apparatus 1504 may be connected through a bus or other means, and the connection through the bus is taken as an example in FIG. 15.

The memory 1502 can be configured to store software programs and modules, and the processor 1501 executes various functional applications and data processing of the image processing device by running the software programs and modules stored in the memory 1502. The memory 1502 may mainly include a program storage area and a data storage area, and the program storage area may store an operating system, at least one application program required for a function, and the like. In addition, the memory 1502 may include high-speed random-access memory, and may also include non-volatile memory, such as at least one magnetic disk storage device, flash memory device, or other volatile solid-state storage device. The input apparatus 1503 may be configured to receive input numeric or character information, and to generate signal input related to user settings and function control of the image processing device.

Specifically, in the present embodiment, the processor 1501 can follow the following instructions to load the executable files corresponding to the processes of one or more application programs into the memory 1502, and the processor 1501 can run the applications stored in the memory 1502 to realize the various functions of the above-described video editing device.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A video editing method, comprising:
    displaying, in response to a preset triggering operation for a target video template, at least one material adding entry corresponding to the target video template;
    receiving a first video material added from a first material adding entry among the at least one material adding entry; and
    generating a first video clip and a freeze-frame video clip based on the first video material in accordance with a video editing operation indicated by the target video template, and compositing to obtain a target video based on the first video clip and the freeze-frame video clip,
    wherein the target video template is configured to indicate the video editing operation to be performed on an added video material to generate a plurality of video clips and composite the plurality of video clips; a mapping relationship between the first video clip and the freeze-frame video clip and positional information of a specified video frame in the first video clip are recorded in the target video template; and the freeze-frame video clip is a video clip obtained by freeze-frame processing based on the specified video frame in the first video clip.

2. The video editing method according to claim 1, wherein before compositing to obtain a target video based on the first video clip and the freeze-frame video clip, the video editing method further comprises:
    displaying, in response to a replacement operation for the freeze-frame video clip, a video track corresponding to the first video clip;
    determining, based on the video track corresponding to the first video clip, a target video frame from the first video clip; and
    generating a target replacement video clip based on the target video frame and updating the freeze-frame video clip corresponding to the first video material using the target replacement video clip.

3. The video editing method according to claim 2, wherein before compositing to obtain a target video based on the first video clip and the freeze-frame video clip, the video editing method further comprises:

acquiring an editing result video clip corresponding to the first video clip after receiving an editing operation for the first video clip, wherein the editing operation comprises a replacement operation, a shooting operation or a clipping operation; and generating a post-editing freeze-frame video clip based on the editing result video clip in accordance with the video editing operation indicated by the target video template;

accordingly, compositing to obtain the target video based on the first video clip and the freeze-frame video clip, comprises:

compositing to obtain the target video based on the editing result video clip and the post-editing freeze-frame video clip.

4. The video editing method according to claim 3, wherein play time information for the freeze-frame video clip is recorded in the target video template, and generating a first video clip and a freeze-frame video clip based on the first video material in accordance with a video editing operation indicated by the target video template, comprises:

generating the first video clip based on the first video material;

acquiring the specified video frame from the first video clip based on the positional information of the specified video frame in the first video clip that is recorded in the target video template; and generating the freeze-frame video clip corresponding to the first video material in accordance with the video editing operation indicated by the target video template based on the play time information of the freeze-frame video clip that is recorded in the target video template as well as the specified video frame.

5. The video editing method according to claim 4, wherein a picture-in-picture identification corresponding to the freeze-frame video clip is recorded in the target video template, and the picture-in-picture identification is configured to indicate whether or not the freeze-frame video clip is in a picture-in-picture form; and generating the freeze-frame video clip corresponding to the first video material in accordance with the video editing operation indicated by the target video template based on the play time information of the freeze-frame video clip that is recorded in the target video template as well as the specified video frame, comprises:

generating the freeze-frame video clip corresponding to the first video clip in accordance with the video editing operation indicated by the target video template based on the play time information of the freeze-frame video clip and the picture-in-picture identification that are recorded in the target video template as well as the specified video frame.

6. The video editing method according to claim 2, wherein play time information for the freeze-frame video clip is recorded in the target video template, and generating a first video clip and a freeze-frame video clip based on the first video material in accordance with a video editing operation indicated by the target video template, comprises:

generating the first video clip based on the first video material;

acquiring the specified video frame from the first video clip based on the positional information of the specified video frame in the first video clip that is recorded in the target video template; and generating the freeze-frame video clip corresponding to the first video material in accordance with the video editing operation indicated by the target video template based on the play time information of the freeze-frame video clip that is recorded in the target video template as well as the specified video frame.

7. A non-transitory computer-readable storage medium, storing instructions, wherein the instructions, when run on a terminal device, cause the terminal device to implement the video editing method according to claim 2.

8. A video editing device, comprising a memory, a processor, and a computer program stored in the memory and runnable on the processor, wherein the processor, when executing the computer program, implements the video editing method according to claim 2.

9. The video editing method according to claim 1, wherein before compositing to obtain a target video based on the first video clip and the freeze-frame video clip, the video editing method further comprises:

acquiring an editing result video clip corresponding to the first video clip after receiving an editing operation for the first video clip, wherein the editing operation comprises a replacement operation, a shooting operation or a clipping operation; and generating a post-editing freeze-frame video clip based on the editing result video clip in accordance with the video editing operation indicated by the target video template;

accordingly, compositing to obtain the target video based on the first video clip and the freeze-frame video clip, comprises:

compositing to obtain the target video based on the editing result video clip and the post-editing freeze-frame video clip.

10. The video editing method according to claim 9, wherein play time information for the freeze-frame video clip is recorded in the target video template, and generating a first video clip and a freeze-frame video clip based on the first video material in accordance with a video editing operation indicated by the target video template, comprises:

generating the first video clip based on the first video material;

acquiring the specified video frame from the first video clip based on the positional information of the specified video frame in the first video clip that is recorded in the target video template; and generating the freeze-frame video clip corresponding to the first video material in accordance with the video editing operation indicated by the target video template based on the play time information of the freeze-frame video clip that is recorded in the target video template as well as the specified video frame.

11. The video editing method according to claim 1, wherein play time information for the freeze-frame video clip is recorded in the target video template, and generating a first video clip and a freeze-frame video clip based on the first video material in accordance with a video editing operation indicated by the target video template, comprises:

generating the first video clip based on the first video material;

acquiring the specified video frame from the first video clip based on the positional information of the specified video frame in the first video clip that is recorded in the target video template; and generating the freeze-frame video clip corresponding to the first video material in accordance with the video editing operation indicated by the target video template based on the play time information of the freeze-frame video clip that is recorded in the target video template as well as the specified video frame.

12. The video editing method according to claim 11, wherein a picture-in-picture identification corresponding to the freeze-frame video clip is recorded in the target video template, and the picture-in-picture identification is configured to indicate whether or not the freeze-frame video clip is in a picture-in-picture form; and generating the freeze-frame video clip corresponding to the first video material in accordance with the video editing operation indicated by the target video template based on the play time information of the freeze-frame video clip that is recorded in the target video template as well as the specified video frame, comprises:

generating the freeze-frame video clip corresponding to the first video clip in accordance with the video editing operation indicated by the target video template based on the play time information of the freeze-frame video clip and the picture-in-picture identification that are recorded in the target video template as well as the specified video frame.

13. A non-transitory computer-readable storage medium, storing instructions, wherein the instructions, when run on a terminal device, cause the terminal device to implement the video editing method according to claim 1.

14. A video editing device, comprising a memory, a processor, and a computer program stored in the memory and runnable on the processor, wherein the processor, when executing the computer program, implements the video editing method according to claim 1.

15. A video editing method, comprising:

acquiring a mapping relationship between a freeze-frame video clip and a first video material in a video editing draft and positional information of a specified video frame in a first video clip, wherein the specified video frame is configured to obtain the freeze-frame video clip after freeze-frame processing, and the video editing draft comprises an initial video material and a video editing operation for the initial video material; and in response to a template publishing operation for the video editing draft, generating and publishing a video template corresponding to the video editing draft, based on the video editing draft, the mapping relationship between the freeze-frame video clip and the first video material, and the positional information of the specified video frame in the first video clip, wherein the video template is configured to indicate the video editing operation to be performed on an added video material to generate the first video clip and the freeze-frame video clip and composite the first video clip and the freeze-frame video clip into a target video.

16. The video editing method according to claim 15, wherein acquiring a mapping relationship between a freeze-frame video clip and a first video material in a video editing draft and positional information of a specified video frame in a first video clip, comprises:

acquiring the mapping relationship between the freeze-frame video clip and the first video material in the video editing draft and the positional information of the specified video frame in the first video clip when a preset freeze-frame binding switch is in an on state.

17. The video editing method according to claim 16, further comprising:

displaying a script setting column corresponding to the initial video material on a script editing page, wherein the script editing column is configured to add an editing script corresponding to the initial video material;

accordingly, in response to a template publishing operation for the video editing draft, generating and publishing a video template corresponding to the video editing draft, based on the video editing draft, the mapping relationship between the freeze-frame video clip and the first video clip, and the positional information of the specified video frame in the first video clip, comprises:

in response to the template publishing operation for the video editing draft, generating and publishing the video template corresponding to the video editing draft, based on the video editing draft, the editing script corresponding to the initial video material and the mapping relationship between the freeze-frame video clip and the first video material in the video editing draft, and the positional information of the specified video frame in the first video clip.

18. The video editing method according to claim 15, further comprising:

displaying a script setting column corresponding to the initial video material on a script editing page, wherein the script editing column is configured to add an editing script corresponding to the initial video material;

accordingly, in response to a template publishing operation for the video editing draft, generating and publishing a video template corresponding to the video editing draft, based on the video editing draft, the mapping relationship between the freeze-frame video clip and the first video clip, and the positional information of the specified video frame in the first video clip, comprises:

in response to the template publishing operation for the video editing draft, generating and publishing the video template corresponding to the video editing draft, based on the video editing draft, the editing script corresponding to the initial video material and the mapping relationship between the freeze-frame video clip and the first video material in the video editing draft, and the positional information of the specified video frame in the first video clip.

19. A non-transitory computer-readable storage medium, storing instructions, wherein the instructions, when run on a terminal device, cause the terminal device to implement the video editing method according to claim 15.

20. A video editing device, comprising a memory, a processor, and a computer program stored in the memory and runnable on the processor, wherein the processor, when executing the computer program, implements the video editing method according to claim 15.

* * * * *